Patented May 2, 1950

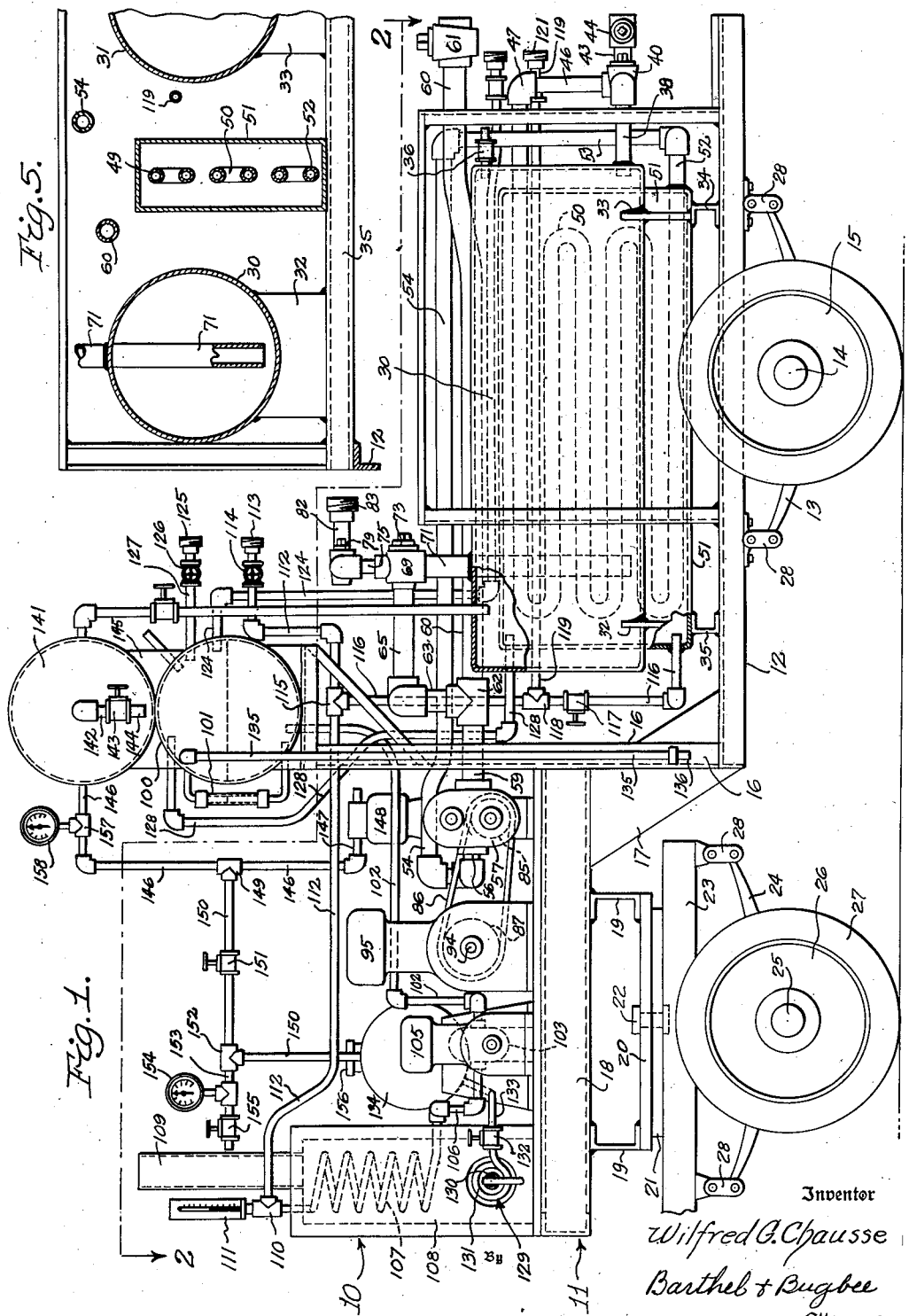

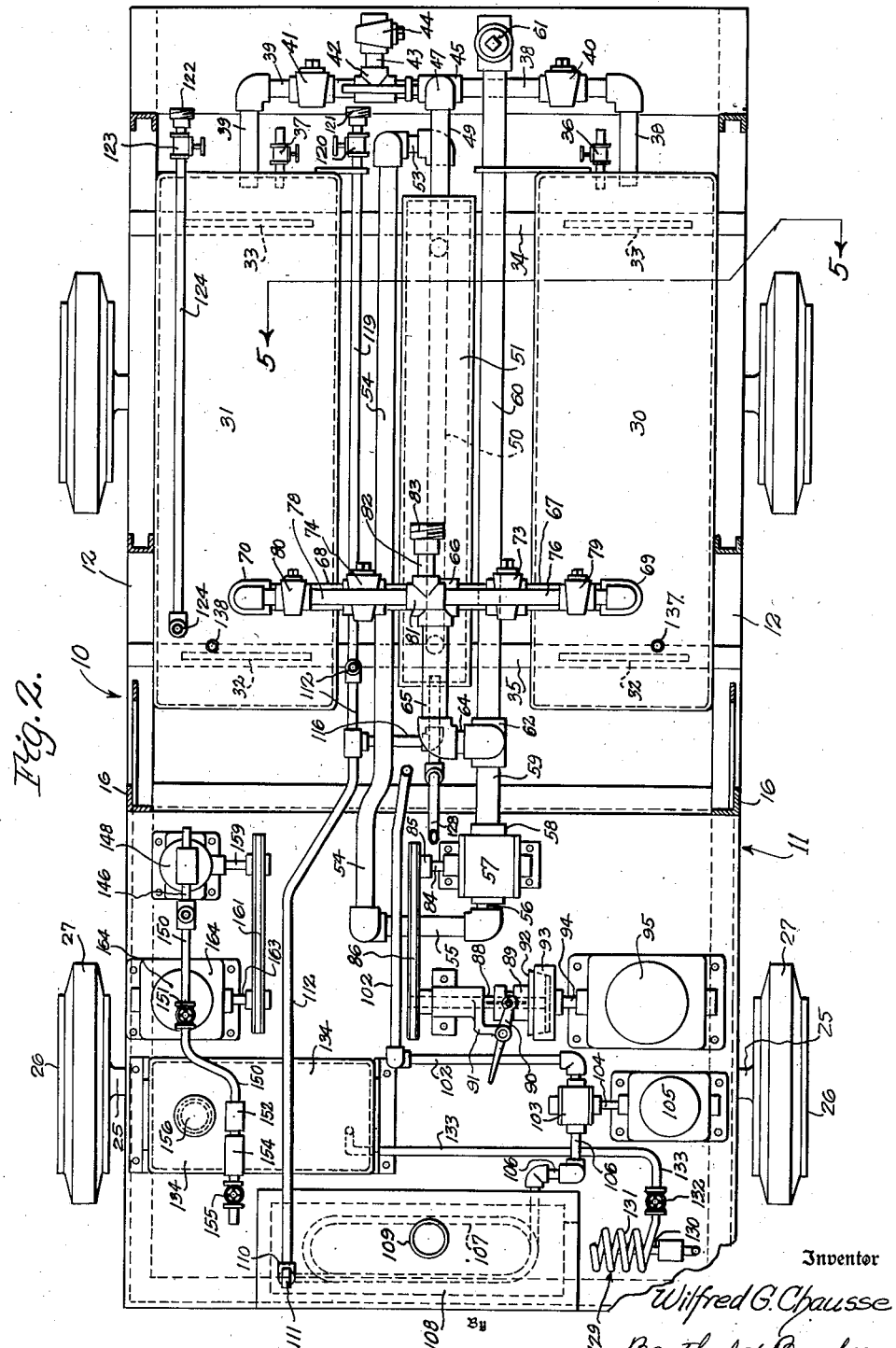

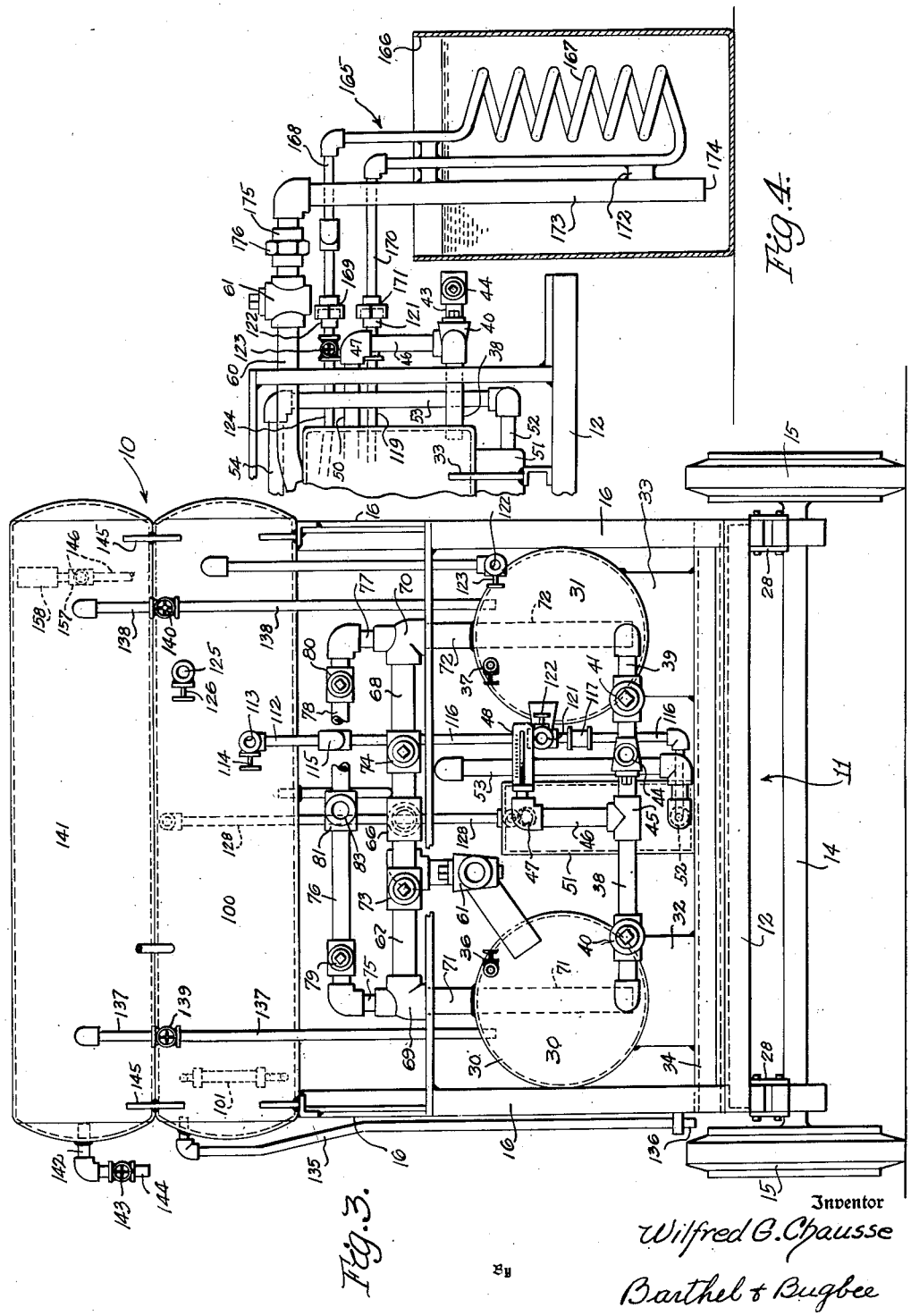

2,506,412

UNITED STATES PATENT OFFICE 2,506,412

PORTABLE DISPENSING APPARATUS FOR HEATING AND DISPENSING HIGHLY VISCOUS LIQUIDS

Wilfred G. Chausse, Detroit, Mich.

Application May 21, 1948, Serial No. 28,476

5 Claims. (Cl. 222—136)

This invention relates to liquid-transporting and dispensing apparatus and in particular to apparatus for transporting and dispensing very viscous liquids which are thick or even solid at low temperatures.

One object of this invention is to provide apparatus for transporting and dispensing highly viscous liquids, such as tar oils or asphaltic oils under low temperature conditions, so that the material will flow easily through hoses and nozzles from the apparatus to the point of use.

Another object is to provide apparatus for transporting and dispensing highly viscous liquids wherein a dual system of tanks is provided with a heating device so that one tank may be drawn upon for liquid while the other tank is being replenished.

Another object is to provide apparatus for transporting and dispensing highly viscous liquids wherein means is provided for heating and recirculating the liquid in the replenished tank while the liquid is being withdrawn from the other tank through a hose and nozzle or other conduit to the point of use.

Another object is to provide an apparatus for transporting and dispensing highly viscous liquids which is especially well adapted to road building and repairing work or to building construction, either of which requires operations to be carried out under low temperature winter conditions in the open air without access to heating or circulating devices other than are contained within the apparatus itself.

Another object is to provide apparatus for transporting and dispensing highly viscous liquids wherein an independent heating device is provided for insertion into barrel drums, or other containers of the highly viscous material, this heating device being connected to the apparatus so as to soften the material in the barrels or drums and thereby facilitate its withdrawal into one of the tanks in the apparatus.

Another object is to provide apparatus for transporting and dispensing highly viscous liquids wherein the highly viscous oil is heated by heat exchange from another heat-transmitting liquid which is circulated in a heating coil through the tank containing the highly viscous oil from a heater located at a distance from the tank.

In the drawings:

Figure 1 is a side elevation, partly in section, of a liquid-transporting and dispensing apparatus according to a preferred form of the invention;

Figure 2 is a top plan view, partly in section, along the line 2—2 in Figure 1;

Figure 3 is a right-hand end elevation of the apparatus shown in Figure 1;

Figure 4 is a side elevation, partly in section, of an auxiliary heating and unloading device attachable to the apparatus of Figures 1 to 3 inclusive for heating and withdrawing highly viscous liquid from a barrel or drum; and Figure 5 is a vertical cross-section along the line 5—5 in Figure 2.

Vehicle construction

Referring to the drawings in detail, Figures 1, 2 and 3 show a liquid transporting and dispensing apparatus, generally designated 10, according to a preferred form of the invention as carried by a vehicle chassis generally designated 11. The chassis 11 consists of a main frame 12 having springs 13 mounted thereon and supporting an axle 14 upon which the rear wheels 15 are mounted. The main frame 12 is connected by the uprights 16 and diagonal braces 17 to a forward frame portion 18. Secured to and beneath the latter are cross members 19 to which a plate 20 is in turn connected.

The plate 20 forms the upper part of a turntable, the lower portion 21 of which is connected thereto by the kingpin or pivot pin 22. The kingpin 22 in turn is connected to the subframe 23 on opposite sides of which springs 24 are mounted. The springs 24 carry an axle 25 (Figure 2) on which the front wheels 26 are in turn mounted. Any suitable conventional towbar and coupling device (not shown) is connected to the forward end of the sub-frame 23 so that the apparatus 10 may be connected to a truck or tractor, and towed from place to place. The wheels 15 and 26 are of course provided with any suitable type of tires 27. The springs 13 and 24 are connected to their respective frames 12 and 23 by the usual spring shackles 28.

Liquid containing and circulating system

The highly viscous liquid which is to be dispensed by the apparatus 10 is contained in a pair of tanks 30 and 31 (Figures 2 and 3) which are mounted on supports 32 and 33 resting upon channel cross-members 34 and 35 (Figure 1) which in turn rest upon the main frame 12. The tanks 30 and 31 are provided with air bleedoff or discharge valves 36 and 37 respectively. The bottom portions of the tanks 30 and 31 are interconnected by pipes 38 and 39 containing valves 40 and 41 respectively (Figure 3), the pipe 39 also containing a T 42 (Figure 2) from which a pipe 43 leads rearward to a valve 44.

The pipes 38 and 39 join one another at a T 45 (Figure 3) from which a pipe 46 rises to an elbow 47 in one side of which a thermometer 48 is inserted. Extending forwardly from the elbow 47 is a pipe 49 leading to the upper end of a zigzag coil 50 mounted within a heating tank 51. The lower end of the coil 50 is connected through various fittings and pipes 52, 53, 54 and 55 to the outlet 56 of a liquid circulating pump 57.

The inlet 58 (Figure 2) of the pump 57 is connected through the pipes 59 and 60 to a valve 61. From a T 62 in the pipes 59 and 60, pipes 63, 64 and 65 lead to a T 66. From the T 66 pipes 67 and 68 lead respectively in opposite directions to fittings 69 and 70 (Figure 3) from which pipes 71 and 72 lead downward into the bottom portions of the tanks 30 and 31. The pipes 67 and 68 contain valves 73 and 74 respectively. Leading upward from the fittings 69 and 70 are pipes 75 and 76 on the left (Figure 3) and pipes 77 and 78 on the right, the pipes 76 and 78 containing valves 79 and 80 and meeting at a T 81 from which a pipe 82 leads rearwardly to a pipe or hose connection 83 (Figure 2).

The drive shaft 84 of the liquid circulating pump 57 is driven by a pulley 85 (Figure 1) by means of a belt 86 from the pulley 87 on a shaft 88. Splined or otherwise slidably and drivingly mounted on the shaft 88 is a clutch collar 89 engaged by a shifting lever 90 (Figure 2) mounted on a bracket 91. The collar 89 is connected to a male clutch element 92 which cooperatively engages a corresponding female clutch element 93 mounted upon the crankshaft 94 of an internal combustion engine 95. By shifting the clutch lever 90 to and fro, the shaft 88 may be operatively connected to or disconnected from the engine drive shaft 94 and hence the pump 57 may be started and stopped at will.

*Liquid heating system*

The viscous liquid to be dispensed and which passes through the foregoing liquid containing and circulating system is heated by means of a heating liquid supplied to the tank 51. The heating liquid, such as a suitable oil, is contained in a tank 100 mounted on the upper end of the uprights 16 and having a sight glass 101 connected to the upper and lower portions thereof to indicate the level of the oil therein (Figure 1). From the tank 100 a pipe 102 leads downward to the intake of a heating liquid circulating pump 103 having a drive shaft 104 driven directly by an internal combustion engine 105 (Figure 2). From the outlet or discharge of the pump 103 a pipe 106 leads to the lower end of a helical coil 107 mounted within a casing 108 from the upper end of which a flue 109 rises. The upper end of the coil 107 is connected to a T 110 in which a thermometer 111 is inserted.

Running forwardly from the T 110 is a pipe 112 which leads to a connection 113 by way of a valve 114 (Figure 1). The pipe 112 also contains a T 115 from which a pipe 116 leads downward through a valve 117 into the bottom of the tank 51. The pipe 116 contains a T 118 (Figure 1) from which a pipe 119 leads rearwardly through a valve 120 to a connection or coupling 121. Paired with the coupling 121 is a coupling 122 on the rearward side of a valve 123 from the forward side of which a pipe 124 runs forward and upward to discharge into the upper portion of the heating liquid tank 100. Likewise paired with the connection or coupling 113 is a second coupling 125 (Figure 1) mounted on the rearward side of a valve 126 from the forward side of which a pipe 127 discharges into the upper portion of the heating liquid tank 100. From the upper part of the interior of the heating tank 51 a pipe 128 leads upward into the upper portion of the heating liquid tank 100.

The heating coil 107 for the heating liquid contained in the tank 100 is heated by means of an oil burner 129 (Figure 2) having a nozzle 130 which is supplied with fuel by a heating coil 131 leading through a valve 132 and pipe 133 to the interior of a liquid fuel tank 134. The latter is adapted to contain fuel oil or other heatable liquid fuel. The opposite end of the heating coil 131 is connected to the nozzle 129 which discharges its flame through the coil 131 into the interior of the casing 108. The fumes resulting from the combustion of the fuel oil escape through the flue 109. The heating liquid circulating system is completed by a vent pipe 135 which leads downward from the upper interior of the heating liquid tank 100 to an outlet 136 to the atmosphere near the main frame 12.

*Compressed air system*

In order to force the dispensed liquid out of the tanks 30 and 31, parallel compressed air lines 137 and 138 (Figure 3) lead downward through valves 139 and 140 into the upper portions of the tanks 30 and 31 from opposite ends of a compressed air tank 141. The compressed air tank 141 is also provided with an auxiliary outlet pipe 142 equipped with a valve 143 and a connection 144 for the attachment of an air hose or for the connection of a liquid hose which it is desired to blow out. The compressed air tank 141 is mounted upon the heating oil tank 100 by means of brackets or supports 145.

Compressed air is supplied to the tank 141 through a pipe 146 (Figure 1) leading to the outlet 147 of an air compressor 148. The pipe 146 contains a T 149 from which a pipe 150 runs through a valve 151 downward into the upper portion of the fuel tank 134. The pipe 150 contains a T 152 from which a pipe 153 runs to a pressure gauge 154 and valve 155. The latter opens to the atmosphere to release the pressure in the liquid fuel tank 134. The tank 154 is provided with a filling connection 156. The pipe 146 is also provided with a T 157 to which is connected an air pressure gauge 158 which shows the pressure within the compressed air tank 141.

The air compressor 148 is driven by a shaft 159 carrying a pulley (not shown) driven by a belt 161 from a pulley (not shown) mounted upon the crankshaft 163 of a gasoline engine 164.

*Liquid charging device*

Figure 4 shows the liquid charging device, generally designated 165, by which the tanks 30 and 31 are filled with the highly viscous liquid to be dispensed. The latter is supplied in any suitable receptacles 166, such as barrels or drums, into which the charging device 165 is lowered. The latter consists of a heating coil 167 having a pipe 168 running from its upper end to a coupling 169 engageable with the connection 122 at the valve 123 on the rearward end of the heating liquid return pipe 124. The lower end of the coil 167 is connected to a pipe 170 leading to a coupling 171 which is attachable to the connection 121 on the rearward end of the valve 120 which in turn is on the rearward end of the heating liquid supply line 119. The coil 167 is supported by a strut 172 welded to it at one end and to a liquid removal pipe 173 at its opposite end. The liquid removal pipe 173 has its lower end 174 positioned near the bottom of the heating coil 167 and extends upward to a coupling 175 engageable with a connection 176 threaded into the rearward end of the valve 61, the forward end of which is mounted on the pipe 69.

*Operation*

In the operation of the liquid transporting and dispensing apparatus of the invention, let it be assumed that the tanks 40 and 31 are to be charged with a highly viscous liquid from drums 166. The liquid charging device 165 is lowered into the liquid in the drum 166 and the heating coil 167 connected to the connections 122 and 121 by means of the couplings 169 and 171 (Figure 4). The valve 61 is shifted to its open position. The internal combustion engines 95, 105 and 164 are then started and the clutch lever 90 shifted to engage the clutch elements 92 and 93 (Figure 2). The pumps 57 and 103 and the air compressor 148 are thereby started in operation. The oil burner 129 is also ignited by means of a conventional torch, whereupon the flame shoots into the casing 108. As the heated gases pass upward through the coil 107 on their way to the flue 109, they heat the heating liquid, such as the heating oil which is being pumped by the pump 103 through the coil 107 from the tank 100 by way of the pipes 102 and 106. The heating oil passes through the pipes 112 and 119, the valve 120 and coupling 121, 171 and pipe 170 to the lower end of the heating coil 167 within the liquid in the drum 166. The heating liquid in passing upward through the coil 167 heats the liquid within the drum 166 and lowers its viscosity. The heating liquid returns to the tank 100 by way of the pipe 168, coupling 122, 169, valve 123 and pipe 124.

Meanwhile, the operation of the pump 57 has created a suction in the lines 59, 60 and 173, causing liquid from the drum 166, which is now heated to become sufficiently viscous to pass upward through the pipes 173, 60 and 59 into the pump 57. The latter pumps this liquid through the pipes 56, 55, 54 (Figure 2) 53 and 52 into the lower end of the coil 50 within the tank 51. The latter has been receiving heating oil meanwhile from the line 112 by way of the line 116 and the valve 117 (Figure 1) and has been discharging the cooled heating liquid through the pipe 128 from the upper part of the tank 51 to the upper part of the heating liquid tank 100.

In the meantime, the liquid to be dispensed passes upward through the coil 50 within the tank 51 and outward and downward through the lines 49 and 46 to the T 45 from whence it moves in opposite directions through the pipes 38 and 39 and valves 40 and 41 (both of which are open at this time) into the lower portions of the tanks 30 and 31. The valves 79 and 80 are open so that the air in the tanks 30 and 31 can escape through the pipe 82 and connection 83.

When both of the tanks 30 and 31 are filled with liquid to be dispensed from the various drums 166 (these being changed and emptied until the tanks 30 and 31 are full) the clutch lever 90 is shifted to separate the clutch elements 92 and 93 (Figure 2) and to halt the pump 57. The charging device 165 can then be disconnected by loosening and unscrewing the couplings 169, 171 and 175 (Figure 4). Subsequently, to the first filling of the tanks 30 and 31 in this manner, it is contemplated that one of these tanks will be in use to dispense liquid while the other tank is being recharged or replenished in the manner shown in Figure 4. During replenishment, for example, of the tank 30, the valve 40 is open and the valve 41 is closed.

The liquid to be dispensed from the tank 30 or 31 is ejected by means of the compressed air reaching the tank through the lines 137 or 138, the proper valve 139 or 140 being opened for that purpose. The gauge 158 shows the air pressure which is available in the tank 141 to perform this work. Due to the pressure of the air in the upper portion of the tank 30 or 31, the liquid to be dispensed is forced out of this tank and upward through the pipe 71 or 72, fitting 69 or 70, pipe 75 or 77, valve 79 or 80, and pipe 76 or 78 to the T 81 and thence through the pipe 82 and connection 83 to the hose (not shown) or other pipe which is connected to the connection 83.

Meanwhile the pressure of the compressed air from the tank 141 passing through the pipes 146 and 150 into the fuel tank 134 forces the fuel downward in the tank and outward through the pipe 133 and valve 132, feeding the fuel to the coil 131 of the oil burner 129 into the nozzle 130 thereof. When it is desired to terminate the flow of dispensed liquid out of the tank 30 or 31 being used, this is done by closing the air valve 139 or 140 in the compressed air supply line 137 or 138 and opening the air vent valve 36 or 37 as the case may be.

Either of the tanks 30 or 31 may be isolated by the proper adjustment of the valves 40, 41, 79, 80, 73 and 74. For example, let it be assumed that the tank 30 is serving temporarily as a standby tank, while being either charged with liquid or heated, and that the dispensed liquid is being drawn from the tank 31. Under these conditions, the valves 79, 74 and 41 are closed whereas the valves 73, 80 and 40 are open. The thermometer 48 is carefully watched because certain tar oils, if heated too hot, change their chemical composition. The valves 40 and 41 are open only during the charging or replenishing operation.

The two connections 113 and 125 (Figures 1 and 3) in the upper portion of the apparatus are for the purpose of supplying heating oil to the heating system for the dispensing hose and its nozzle, if such a heating system is used for the hose and nozzle. Such a heated hose and nozzle is disclosed and claimed in my co-pending application Serial No. 789,040 filed December 1, 1947 for Heated hose.

After either of the tanks 30 or 31 is charged or replenished with the liquid to be dispensed, this liquid is constantly recirculated and heated by means of the pump 57 through the pipes 55, 54, 53, and 52, the coil 50, the pipes 49, 46 and 38 and the valve 40 into the tank 30. The liquid being recirculated in this manner passes upward from the tank 30 through the pipes 71 and 67, the valve 73, the T 66, the pipes 65, 64 and 63, the T 62 and the pipe 59 back to the pump 57.

Occasionally in extremely cold weather, the liquid being dispensed from one tank may cool off to the extent of becoming unduly thick or viscous while the liquid in the other tank is being heated and recirculated. In that event, the operator merely shifts the valve in the previously-described manner without waiting to empty the tank from which he is drawing off the liquid.

The liquid in the partially empty tank is then reheated and recirculated while the tank which was previously being heated and recirculated is now being drawn from. In this way, the apparatus is adaptable to the most extreme conditions of temperature and the liquid being dispensed can always be maintained in a warm and very fluid condition.

The apparatus of the present invention also permits the heating of the dispensed liquid to be very accurately controlled. This is done by accurately controlling the temperature of the heating fluid. In prior dispensing apparatus of this class, where the tanks of the dispensed liquid are heated directly from a heat source, the liquid is frequently overheated, with a resultant evaporation of certain solvents or volatile ingredients, so that its chemical composition is altered in an unsatisfactory manner and a faulty product is the result. By remotely heating the heating fluid and conducting it to the tank where it is brought into heat-exchange relationship with the dispensed liquid, the present invention completely eliminates these defects of prior apparatus and enables the temperature of the dispensed liquid to be maintained within a very narrow range of temperatures which are high enough to cause easy flow of the liquid but low enough to avoid any series change in its chemical composition.

What I claim is:

1. A portable dispensing apparatus for highly viscous liquids comprising a vehicle, a pair of dispensing liquid containers thereon, a dispensing liquid conduit system connected to said containers and including a heat-exchanger, a heater arranged to heat said heat-exchanger, a liquid circulator connected to said liquid conduit system, and valves selectively operable to isolate a portion of said liquid conduit system in circuit with said circulator and one of said containers while connecting another portion of said liquid conduit system in dispensing relationship with the other container.

2. A portable dispensing apparatus for highly viscous liquids comprising a vehicle, a pair of dispensing liquid containers thereon, a dispensing liquid conduit system connected to said containers and including a heat-exchanger, a heater, a heating fluid conduit system positioned to receive heat from said heater and arranged in heat-exchange relationship with said heat-exchanger, a liquid circulator connected to said liquid conduit system, and valves selectively operable to isolate a portion of said liquid conduit system in circuit with said circulator and one of said containers while connecting another portion of said liquid conduit system in dispensing relationship with the other container.

3. A portable dispensing apparatus for highly viscous liquids comprising a vehicle, a pair of dispensing liquid containers thereon, a dispensing liquid conduit system connected to said containers and including a heat-exchanger, a heater, a heating tank, a heating fluid conduit system positioned to receive heat from said heater and having a portion thereof connected to said tank and arranged in heat-exchange relationship with said heat-exchanger, said heat-exchanger being disposed in said tank, a liquid circulator connected to said liquid conduit system, and valves selectively operable to isolate a portion of said liquid conduit system in circuit with said circulator and one of said containers while connecting another portion of said liquid conduit system in dispensing relationship with the other container.

4. A portable dispensing apparatus for highly viscous liquids comprising a vehicle, a pair of dispensing liquid containers thereon, a dispensing liquid conduit system connected to said containers and including a heat-exchanger, a heater arranged to heat said heat-exchanger, a liquid circulator connected to said liquid conduit system, valves selectively operable to isolate a portion of said liquid conduit system in circuit with said circulator and one of said containers while connecting another portion of said liquid conduit system in dispensing relationship with the other container, a gas compressor, a gas conduit system connecting said compressor to said containers, and gas valves selectively operable to admit compressed gas from said gas conduit system to one of said containers to force liquid out of said container into said dispensing liquid conduit system.

5. A portable dispensing apparatus for highly viscous liquids comprising a vehicle, a pair of dispensing liquid containers thereon, a dispensing liquid conduit system connected to said containers and including a heat-exchanger, a heater arranged to heat said heat-exchanger, a liquid circulator connected to said liquid conduit system, a dispensing liquid by-pass conduit interconnecting said liquid conduit system and said liquid circulator, and valves selectively operable to isolate one of said containers in circuit with said circulator and said by-pass conduit while connecting the other container in dispensing relationship with another portion of said liquid conduit system.

WILFRED G. CHAUSSE.

REFERENCES CITED

The following references are of record in the file of this patent:

UNITED STATES PATENTS

| Number | Name | Date |
| --- | --- | --- |
| 872,561 | Fess | Dec. 3, 1907 |
| 1,883,021 | Silknitter | Oct. 18, 1932 |
| 1,929,231 | Yirava | Oct. 3, 1933 |
| 2,136,738 | Giordano | Nov. 15, 1938 |
| 2,461,766 | Peeps | Feb. 15, 1940 |